United States Patent [19]
Ohtake et al.

[11] Patent Number: 5,620,168
[45] Date of Patent: Apr. 15, 1997

[54] FLUID-FILLED ELASTIC MOUNT HAVING ORIFICE PASSAGE CONTROL ROTARY VALVE CONNECTED TO DRIVE ROD AT RADIAL POSITION OFFSET FROM ROTATION AXIS OF THE VALVE

[75] Inventors: Shuji Ohtake, Utsunomiya; Rentaro Kato; Tatsuya Suzuki, both of Kasugai, all of Japan

[73] Assignee: Tokai Rubber Industries, Ltd., Japan

[21] Appl. No.: 582,068

[22] Filed: Jan. 2, 1996

[51] Int. Cl.⁶ .............................. F16M 7/00; F16F 13/00
[52] U.S. Cl. ...................... 267/140.13; 267/219
[58] Field of Search .............. 267/140.11, 140.13, 267/140.14, 219, 220, 140.12, 140.15, 217; 248/562, 636; 180/300, 312, 902

[56] References Cited

U.S. PATENT DOCUMENTS

| | | |
|---|---|---|
| 2,856,179 | 10/1958 | Hogan . |
| 4,648,576 | 3/1987 | Matsui .............................. 267/140.14 |
| 4,660,812 | 4/1987 | Dan et al. . |
| 4,700,933 | 10/1987 | Chikamori ......................... 267/140.14 |
| 4,789,143 | 12/1988 | Smith et al. ....................... 267/140.14 |
| 4,793,600 | 12/1988 | Kojima . |
| 4,802,648 | 2/1989 | Decker et al. ..................... 267/140.15 |
| 4,925,162 | 5/1990 | Kojima .............................. 267/140.13 |
| 5,209,462 | 5/1993 | LeFol et al. ....................... 267/140.14 |
| 5,297,769 | 3/1994 | LeFol et al. ....................... 267/140.13 |
| 5,443,574 | 8/1995 | Ohtake et al. ..................... 267/140.14 |

FOREIGN PATENT DOCUMENTS

| | | |
|---|---|---|
| 60-104824 | 6/1985 | Japan . |
| 4-122841 | 11/1992 | Japan . |

*Primary Examiner*—Douglas C. Butler
*Attorney, Agent, or Firm*—Parkhurst, Wendel & Burr, L.L.P.

[57] ABSTRACT

A fluid-filled elastic mount wherein a fluid-tight space defined by two mounting members, an elastic body and a flexible diaphragm is divided by a partition member into pressure-receiving and equilibrium chambers communicating with each other through at least one orifice passage, and through a rotary valve which is accommodated in a valve hole in the partition member such that the rotary valve is rotatable in sliding contact with a sliding surface of the valve hole. The valve has a cutout communicating with the equilibrium chamber, and a valve portion adjacent to the valve portion, so that the orifice passage is selectively closed by the valve member and opened through the cutout in communication with the equilibrium chamber. The elastic mount includes a mechanism for converting a reciprocating movement into a rotary motion of the valve. The mechanism includes a drive rod which is connected to the valve such that the connecting point is offset from the rotation axis of the vale in the radial direction. The other end of the drive rod is located outside the elastic mount for receiving the reciprocating movement.

10 Claims, 9 Drawing Sheets

FLUID-FILLED ELASTIC MOUNT HAVING ORIFICE PASSAGE CONTROL ROTARY VALVE CONNECTED TO DRIVE ROD AT RADIAL POSITION OFFSET FROM ROTATION AXIS OF THE VALVE

BACKGROUND OF THE INVENTION

1. Field of the Invention

The present invention relates in general to a fluid-filled elastic mount adapted to provide a vibration damping effect based on fluid flows through an orifice passage. More particularly, the present invention is concerned with such a fluid-filled elastic mount having a rotary valve operated to control fluid communication of orifice passage or passages with fluid chambers, to thereby change damping characteristics of the elastic mount.

2. Discussion of the Prior Art

There is well known a fluid-filled elastic mount as disclosed in JP-A-60-104824, which is connected to and interposed between two members of a vibration system such that these two members are elastically connected to each other, or such that one of these two member is supported by the other member in a vibration damping fashion. Such a fluid-filled elastic mount comprises (a) a first mounting member to be attached to one of the two members of the vibration system, (b) a generally cylindrical second mounting member to be attached to the other of the two members of the vibration system, the second mounting member including a cylindrical wall, (c) an elastic body elastically connecting the first and second mounting members so as to fluid-tightly close one of axially opposite open ends of the second mounting member, (d) a flexible diaphragm which fluid-tightly closes the other open end of the second mounting member, and which cooperates with the elastic body and the second mounting member to define a fluid-tight space, (e) a partition member disposed in the fluid-tight space so as to divide the fluid-tight space into a pressure-receiving chamber which is partially defined by the elastic body and filled with a non-compressible fluid and whose pressure changes upon application of a vibrational load to the elastic mount, and an equilibrium chamber which is partially defined by the flexible diaphragm and filled with the non-compressible fluid and whose volume is variable by displacement of the flexible diaphragm, (f) means for defining at least one orifice passage for fluid communication between the pressure-receiving chamber and the equilibrium chamber. This type of fluid-filled elastic mount is capable of exhibiting high damping effects based on resonance of the fluid flows through the orifice passage, which effects cannot be provided by an elastic mount which does not utilize fluid flows through an orifice passage. For example, the fluid-filled elastic mount is suitably used as an engine mount for an automotive vehicle.

Generally, a fluid-filled elastic mount such as a vehicle engine mount is required to be able to damp vibrations having different frequencies and amplitudes. However, the range of frequency of the input vibrations that can be effectively damped by fluid flows through an orifice passage is narrower than the frequency range of the input vibrations. Therefore, a fluid-filled elastic mount using a single orifice passage is not generally capable of exhibiting desired damping characteristics for dealing with the input vibrations. In view of this tendency, JP-U-4-122841 (laid-open publication of Japanese Utility Model Application) proposes a fluid-filled engine mount which has a first orifice passage, a second orifice passage tuned to damp vibrations whose frequencies are higher than those of the vibrations that can be damped by the first orifice passage, and a third orifice passage tuned to damp vibrations whose frequencies are higher than those of the vibrations that can be damped by the second orifice passage. A flexible rubber layer or film is disposed in the third orifice passage such that the rubber layer undergoes elastic deformation and permits fluid flows in the third orifice passage upon application of high-frequency vibrations, and restricts the fluid flows in the third orifice passage upon application of low-frequency vibrations. The proposed engine mount includes a rotary valve which is supported by the partition member such that the rotary valve is rotatable about an axis substantially perpendicular to the axis of the generally cylindrical second mounting member. The second and third orifice passages are open on a sliding surface of the partition member on which the rotary valve is slidably rotated, so that the second and third orifice passages are selectively closed and opened, namely, selectively brought into communication with the equilibrium chamber when the rotary valve is rotated between two positions corresponding to the second and third orifice passages. Thus, the proposed engine mount exhibits different damping characteristics with selective functioning of the three orifice passages.

In such known engine mount, a drive shaft of the rotary valve which receives a torque from an external actuator projects outwardly of the engine mount, extending through the partition member and the second mounting member. The drive shaft is connected at its outer end to the external actuator, so that the rotary valve is rotated by the actuator through the drive shaft. Generally, a linear actuator of pneumatic diaphragm type adapted to generate a reciprocating or linear movement is suitably used for the engine mount, since it is simple in construction and since a vacuum source is usually provided on a motor vehicle with an internal combustion engine.

Such linear actuator requires a motion converting mechanism including a link member for converting a reciprocating movement into a rotary movement of the rotary valve. That is, the output shaft of the linear actuator should be connected to the rotary drive shaft of the rotary valve through the link member. The link member is connected at its one end to the rotary drive shaft which projects from the housing of the engine mount, and the output shaft of the linear actuator is connected to the other end of the link member. Accordingly, the converting mechanism uses a relatively large number of components for connecting the drive shaft of the linear actuator to the rotary drive shaft of the rotary valve, and the assembling of the actuator with the engine mount tends to be cumbersome. Further, the drive shaft of the rotary valve inevitably projects a considerable distance from the engine mount, and the link member and the output shaft of the linear actuator are required to be spaced a considerably large distance away from the housing of the engine mount. In addition, the movement of the link member requires a large space between the linear actuator and the engine mount. Thus, the engine mount equipped with the linear actuator tends to be large-sized and requires a considerably large space for installation on the vehicle.

SUMMARY OF THE INVENTION

It is therefore an object of this invention to provide a fluid-filled elastic mount in which a rotary valve for controlling fluid communication of an orifice passage is suitably operated by a linear actuator, and which is simple in construction and requires a comparatively small space for installation.

The above object may be achieved according to the principle of the present invention, which provides a fluid-filled elastic mount comprising: (a) a first mounting member to be attached to one of two members of a vibration system; (b) a generally cylindrical second mounting member to be attached to the other of the two members, the second mounting member including a cylindrical wall; (c) an elastic body elastically connecting the first and second mounting members so as to fluid-tightly close one of axially opposite open ends of the second mounting member; (d) a flexible diaphragm fluid-tightly closing the other of the axially opposite open ends of the second mounting member, and cooperating with the elastic body and the second mounting member to define a fluid-tight space; (e) a partition member disposed in the fluid-tight space so as to divide the fluid-tight space into a pressure-receiving chamber which is partially defined by the elastic body and filled with a non-compressible fluid and whose pressure changes upon application of a vibrational load to the elastic mount, and an equilibrium chamber which is partially defined by the flexible diaphragm and filled with the non-compressible fluid and whose volume is variable by displacement of the flexible diaphragm, the partition member having a sliding surface which defines a valve hole; (f) means for defining at least one orifice passage for fluid communication between the pressure-receiving and equilibrium chambers; (g) a rotary valve accommodated in the valve hole such that the rotary valve is rotatable in sliding contact with the sliding surface about an axis thereof which extends in a radial direction of the second mounting member, the rotary valve having a cutout communicating with the equilibrium chamber, and including a valve portion adjacent to the cutout, the at least one orifice passage being open on the sliding surface of the valve hole, so that at least one of the at least one orifice passage is selectively closed by the valve portion and opened through the cutout in communication with the equilibrium chamber; and (h) a motion converting mechanism for converting a reciprocating movement into a rotary motion of the rotary valve, the motion converting mechanism including a drive rod connected at one of opposite ends thereof to the rotary valve at a position which is offset from the axis of the rotary valve in a radial direction of the rotary valve, the drive rod extending through the cutout, the equilibrium chamber and the flexible diaphragm, the other of the opposite ends of the drive rod being located outside the fluid-tight space for receiving the reciprocating movement.

In the fluid-filled elastic mount of the present invention constructed as described above, the drive rod is connected at one end thereof directly to the rotary valve such that the point of connection is offset by a suitable distance from the axis of rotation of the rotary valve in the radial direction, so that the linear movement of the drive rod is converted into the rotary movement of the rotary valve. Therefore, the motion converting mechanism employed in the present elastic mount does not require or include an exclusive link member and associated components for converting the linear or reciprocating movement of the drive rod into the rotary movement of the rotary valve. Accordingly, the number of components of the motion converting mechanism is significantly reduced, and the mechanism is considerably simplified in construction.

Further, the drive rod extends through the cutout formed in the rotary valve. In this arrangement, the cutout which serves as part of the rotary valve for selective fluid communication of the orifice passage or passages with the equilibrium chamber also serves as a space for accommodating the drive rod and permitting the movement of the drive rod. Accordingly, the required distance between the rotary valve and the outer end of the drive rod outside the elastic mount is minimized, and the elastic mount is simplified and small-sized requiring a reduced space for installation.

According to one preferred form of this invention, there are provided three orifice passages, namely, a first orifice passage tuned to damp low-frequency vibrations, a second orifice passage tuned to damp medium-frequency vibrations whose frequencies are higher than those of the low-frequency vibrations, and a third orifice passage tuned to damp high-frequency vibrations whose frequencies are higher than those of the medium-frequency vibrations. In the third orifice passage, there is disposed a flow restrictor member which is displaceable so as to permit a predetermined amount of flow of the non-compressible fluid in the third orifice passage. In the present form of the invention, the second and third orifice passages are open on the sliding surface of the valve hole, so that the second and third orifice passages are selectively brought into communication with the equilibrium chamber through the cutout of the rotary valve when the rotary valve is operated between two operating positions thereof. The present fluid-filled elastic mount having the three orifice passages is comparatively simple in construction and small-sized.

The drive rod may be connected at the other of the opposite ends thereof to an output shaft of a linear actuator operated by selective application of reduced pressure such that the rotary valve is placed in one of the two operating positions when the reduced pressure is applied to the linear actuator.

According to another preferred form of this invention, the rotary valve comprises: a pair of cylindrical bearing portions rotatable about the axis in sliding contact with the sliding surface of the valve hole in the partition member; and a drive portion fixedly provided on one of the cylindrical bearings or on the valve portion. The valve portion extends in an axial direction of the rotary valve and connecting the pair of cylindrical bearing portions. The valve portion consists of an arcuate portion corresponding to a predetermined portion of an entire circumference of the rotary valve, while the cutout corresponds to a rest of the entire circumference of the rotary valve. The arcuate portion is rotatable about the axis in sliding contact with the sliding surface so that the orifice passage or passages is/are selectively brought into communication with the equilibrium chamber through the cutout. The drive portion is rotatable about the axis with the cylindrical bearing portions and the valve portion. The rotary valve constructed as described above is compact in construction and small-sized, leading to reduced weight of the elastic mount. Further, the present rotary valve assures high operating stability owing to the simple construction.

The drive portion may consist of a drive disc formed integrally with the valve portion. The drive disc includes first engaging means such as a pivot pin located at the position offset from the axis of the rotary valve. On the other hand, the drive rod includes second engaging means such as a hole provided at the inner end. The second engaging means engages the first engaging means for pivotal connection of the drive rod to the drive disc for rotating the rotary valve.

BRIEF DESCRIPTION OF THE DRAWINGS

The above and other objects, features, advantages, and technical and industrial significance of the present invention will be better understood by reading the following detailed description of a presently preferred embodiment of the invention, when considered in connection with the accompanying drawings, in which.

DETAILED DESCRIPTION OF THE PREFERRED EMBODIMENT

Figure 1:
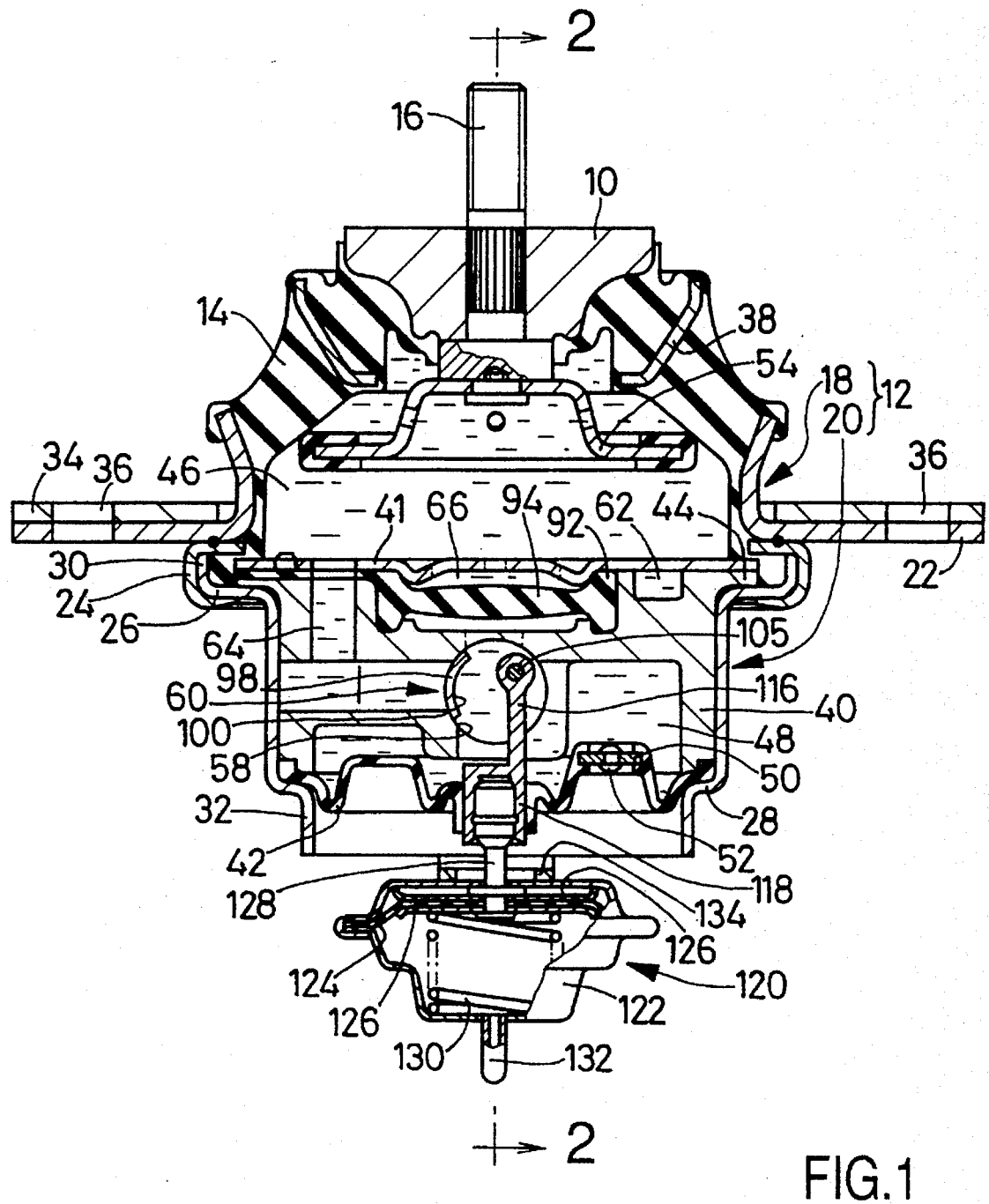
FIG. 1 is an elevational view in longitudinal cross section of a fluid-filled elastic mount in the form of a motor vehicle engine mount constructed according to one embodiment of this invention.
Figure 2:
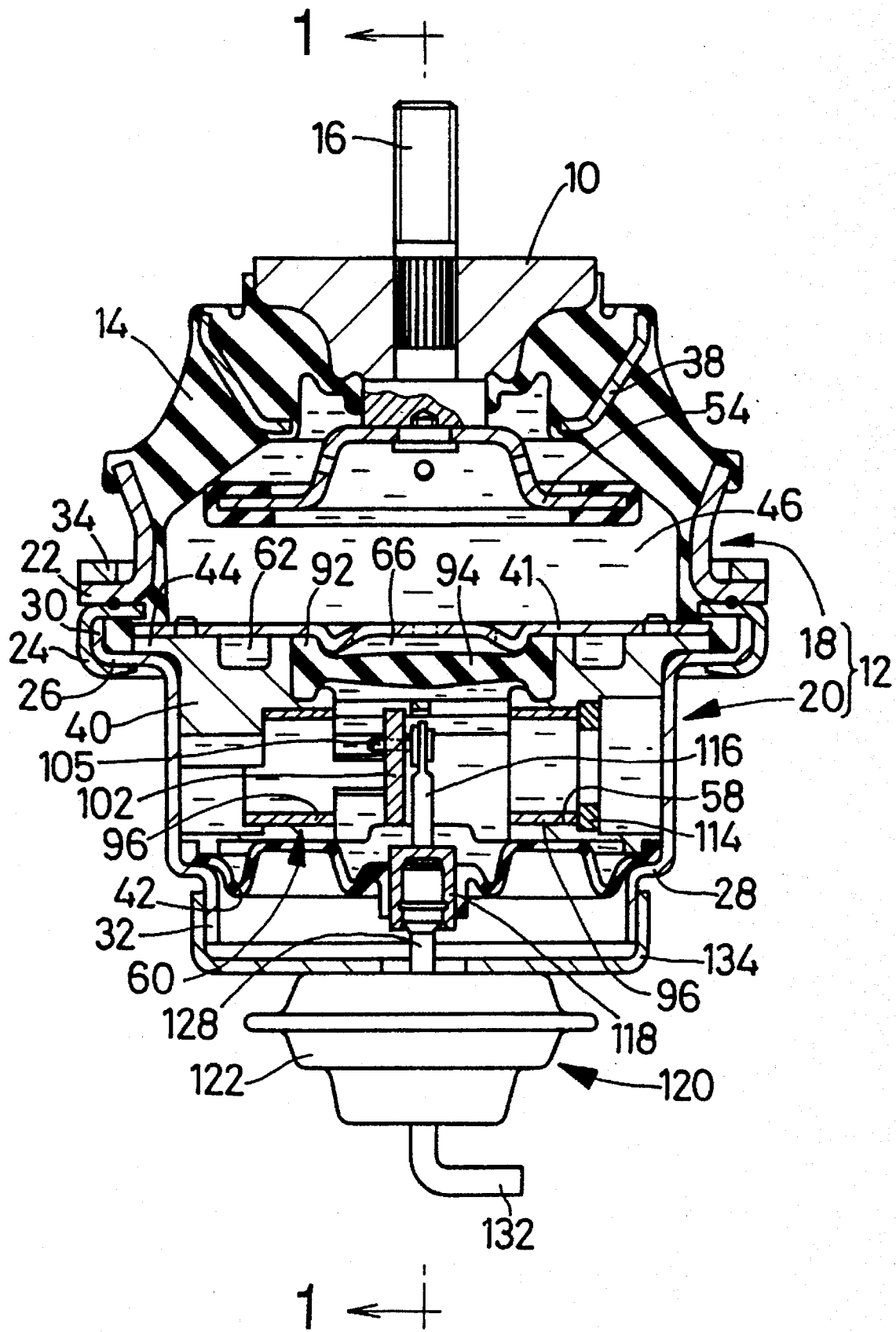
FIG. 2 is an elevational view in cross section of the engine mount, taken along line 2—2 of FIG. 1.

Referring first to FIGS. 1 and 2, there is shown an engine mount for use on a motor vehicle, which is constructed according to one embodiment of this invention. This engine mount includes a first mounting member 10 made of a metallic material, a second mounting member 12 also made of a metallic material, and an elastic body 14 which is interposed between the first and second mounting members 10, 12 so as to elastically or flexibly connect these mounting members 10, 12. This engine mount is interposed between a power unit and the vehicle body such that the first mounting member 10 is attached to one of the power unit and the vehicle body, while the second mounting member 12 is attached to the other of the power unit and the vehicle body. Thus, the power unit is elastically mounted on or supported by the vehicle body through the present engine mount. When the present engine mount is thus installed on the vehicle, a load or weight of the power unit acts on the elastic body 14, and the elastic body 14 is elastically deformed, whereby the first and second mounting members 10, 12 are displaced toward each other by a certain relative distance in a longitudinal direction in which the first and second mounting members 10, 12 are spaced from each other.

The first mounting member 10 has a substantially inverted frustoconical shape taken as a whole in cross section, and is provided with a mounting bolt 16 secured thereto so as to extend therethrough such that the headed end of the bolt 16 is located at the small end of the member 10. The mounting bolt 16 has a mounting portion which is remote from the headed end and which extends outwards from the large diameter end in a direction away from the second mounting member 12. The first mounting member 10 is attached at its mounting portion to the power unit or vehicle body.

The second mounting member 12 consists of an upper sleeve 18 and a lower sleeve 20 each having a cylindrical shape. The upper sleeve 18 includes a mounting plate portion 22 formed at one of its opposite axial open ends so as to extend in the radially outward direction. The upper sleeve 18 is provided with a calking member 24 made of a metallic material. This calking member 24 is welded to the lower surface of a radially inner portion of the mounting plate portion 22. The lower sleeve 20 includes a radially outward upper shoulder 26 and a radially inward lower shoulder 28 which are formed at the opposite axial ends, respectively. With these upper and lower shoulders 26, 28, the lower sleeve 20 is given a large-diameter portion 30 and a small-diameter portion 32 as the upper and lower end portions. The upper and lower sleeves 18, 20 are fixed to each other such that the large-diameter end portion 30 of the lower sleeve 20 is calked to the upper sleeve 18 by the calking member 24, such that the large-diameter end portion 30 overlaps the calking member 24 in the axial direction of the sleeves 18, 20. These upper and lower sleeves 18, 20 are thus fixed together, so as to form the second mounting member 12 which has a generally cylindrical shape.

The mounting plate portion 22 of the upper sleeve 18 is reinforced by a reinforcing plate 34 placed thereon. The mounting plate portion 22 and the reinforcing plate 34 have a plurality of bolt holes 36 formed therethrough, so that the second mounting member 12 is attached to the power unit or vehicle body with bolts inserted through these bolt holes 36.

The first mounting member 10 is disposed with a suitable distance away from the open end of the upper sleeve 18 of the second mounting member 12 in the axial direction of the sleeves 18, 20, and the elastic body 14 is interposed between these first and second mounting members 10, 12. The elastic body 14 has a generally tapered shape in cross section, with a relatively large wall thickness, as shown in FIGS. 1 and 2. When the elastic body 14 is formed in a vulcanization process, the outer circumferential surface of the large-diameter end portion of the elastic body 14 is bonded to the inner circumferential surface of the open end portion of the upper sleeve 18 of the second mounting member 12, while the inner circumferential surface of the small-diameter end portion of the elastic body 14 is bonded to the outer circumferential surface of the first mounting member 10. Thus, the elastic body 14 fluid-tightly closes the open end of the upper sleeve 18 of the second mounting member 12. It is noted that the spring characteristic of the elastic body 14 is adjusted by a ring member 38 embedded in an axially intermediate portion of the elastic body 14.

Within the second mounting member 12, there are disposed a partition member 40 and a circular partition plate 41 which are superposed on each other in their axial direction. The partition member 40 is a generally cylindrical member or a disk member with a relatively large thickness. The open end of the lower sleeve 20 remote from the upper sleeve 18 of the second mounting member 12 is fluid-tightly closed by a diaphragm 42, which is a substantially circular thin-walled flexible layer or film made of a rubber material. The partition member 40 has a flange portion 44 formed at its axial end (upper end as viewed in FIGS. 1 and 2) so as to extend radially outwardly. The partition member 40 is fluid-tightly gripped at the flange portion 44 by and between the shoulder 26 of the lower sleeve 20 and the calking member 24, together with the partition plate 41 whose radially outer end portion being gripped by and between the calking member 24 and the flange portion 44. On the other hand, the diaphragm 42 is fluid-tightly gripped at its radially outer end portion by and between the shoulder 28 of the lower sleeve 20 and the end face of the partition member 40 remote from the flange portion 44.

Thus, the opposite open ends of the second mounting member 12 are fluid-tightly closed by the elastic body 14 and the diaphragm 42, so that the second mounting member 12 cooperates with the elastic body 14 and the diaphragm 42 to define a fluid-tight space. This space is divided by the partition member 40 into a pressure-receiving chamber 46 and an equilibrium chamber 48, which are located on the opposite sides of the partition member 40. That is, the pressure-receiving chamber 46 is partially defined by the elastic body 14, while the equilibrium chamber 48 is partially defined by the diaphragm 42. These pressure-receiving and equilibrium chambers 46, 48 are filled with a suitable non-compressible fluid such as water, alkylene grycol, polyalkylene grycol, or silicone oil. For effective damping of input vibrations based on resonance the non-compressible fluid, it is preferable to fill the chambers 46, 48 with a low-viscosity fluid whose viscosity is not higher than 0.1Pa.s. The chambers 46, 48 may be filled with the selected fluid, by injecting the fluid into these chambers through a hole formed through a disk 50 which is bonded to the diaphragm 42 such that the hole communicates with the equilibrium chamber 48. After the chambers 46, 48 are filled with the fluid, the hole in the disk 50 is closed by a rivet. In this respect, it is noted that the chambers 46, 48 communicate with each other as described below.

Within the pressure-receiving chamber 46, there is disposed a hat-shaped member 54 whose central bottom portion is secured to the first mounting member 10 such that the central bottom portion is sandwiched between the head of the mounting bolt 16 and the small end of the member 10. When the present engine mount is not installed on the vehicle, the periphery of a radially outer flange portion of the hat-shaped member 54 is in contact with the inner surface of the elastic body 14 (which partially defines the pressure-receiving chamber 46). When the engine mount is installed on the vehicle, the elastic body 14 is elastically deformed by the weight of the power unit, whereby the hat-shaped member 54 is displaced together with the first mounting member 10 toward the second mounting member 12, so that an annular restricted fluid passage is formed between the inner surface of the elastic body 14 and the periphery of the hat-shaped member 54. This restricted fluid passage enables the engine mount to exhibits a sufficiently low spring constant with respect to very-high-frequency vibrations such as booming noises (generated during medium- or high-speed running of the vehicle), based on resonance of the non-compressible fluid which is forced to flow through the restricted fluid passage upon application of such vibrations between the first and second mounting members 10, 12.

The generally cylindrical partition member 40 which divides the above-indicated fluid-tight space into the pressure-receiving and equilibrium chambers 46, 48 has a valve hole 58 having a circular cross section (as seen in FIG. 1). The valve hole 5B has an axis which extends in a radial direction of the second mounting member 12 and which passes the axis of the second mounting member 12. Within this valve hole 58, there is disposed a rotary valve 60 such that the rotary valve 60 is rotatable about a center axis thereof aligned with the center line of the valve hole 58. The partition member 40 also has a first, a second and a third orifice passage 62, 64, 66 formed therethrough for fluid communication between the pressure-receiving chamber 46 and the equilibrium chamber 48. The open ends of the second and third orifice passages 64, 66 on the side of the equilibrium chamber 48 are exposed on a sliding surface of the valve hole 58 on which the rotary valve 60 is slidable rotated. In operation of the rotary valve 60, the second and third orifice passages 64, 66 are selectively communicated with the equilibrium chamber through the rotary valve 60.

Figure 3:
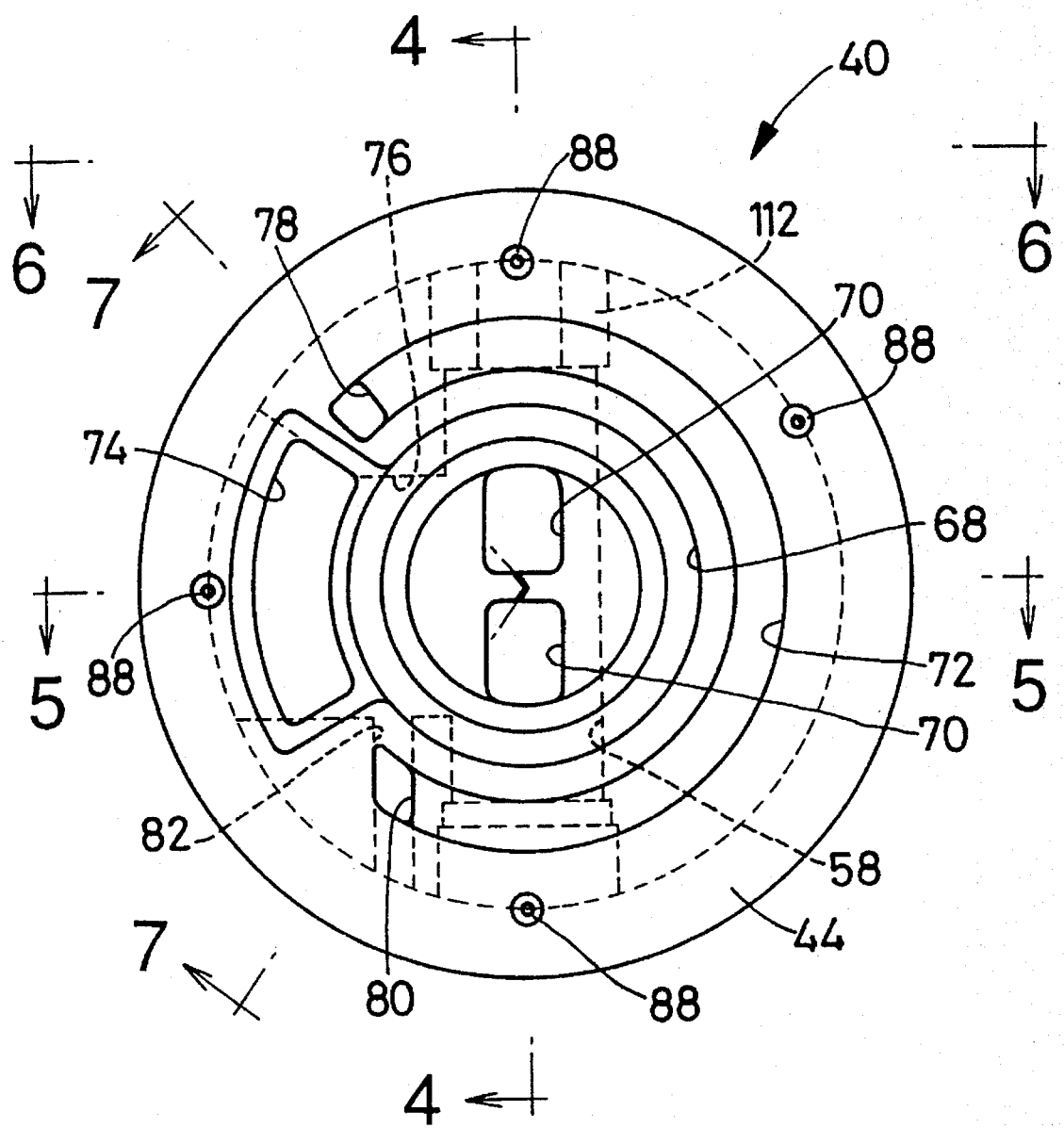
FIG. 3 is a plan view of a partition member used in the engine mount of FIG. 1.

Described in detail by reference to FIG. 3 through FIG. 7, the partition member 40 has a central circular recess 68 formed and open in a central portion of its upper surface (as seen in FIGS. 1 and 2), as shown in FIGS. 3–5 and 7. This circular recess 68 communicates with the valve hole 59 through communication holes 70, 70 formed through the bottom wall of the recess 68. The partition member 40 also has a circumferential groove 72 formed and open in its upper surface such that the groove 72 is located radially outwardly of the circular recess 68, as most clearly indicated in FIG. 4. This circumferential groove 72 has a length which corresponds to about two-thirds (⅔) of the entire circumference of the circular recess 68, as indicated in FIG. 3. The partition member 40 further has an arcuate hole 74 formed and open in a portion its upper surface in which the circumferential groove 72 is not formed. The partition member 50 further has a communication hole 76 extending in a radial direction perpendicular to the direction of extension of the valve hole 58. The communication hole 76 communicates at one end with the bottom end portion of the arcuate hole 74 and at the other end with the valve hole 58. The partition member 50 also has a through-hole 78, an axial hole 80 and a connecting hole 82. The through-hole 78 is formed through the partition member 50 in the axial direction, in communication with one of the opposite ends of the circumferential groove 72. The axial hole 80 has a predetermined depth and communicates with the other end of the circumferential groove 72. The connecting hole 82 extends in a direction substantially parallel to the valve hole 58, and connects the bottom end portion of the axial hole 80 with the communication hole 76.

Figure 8:
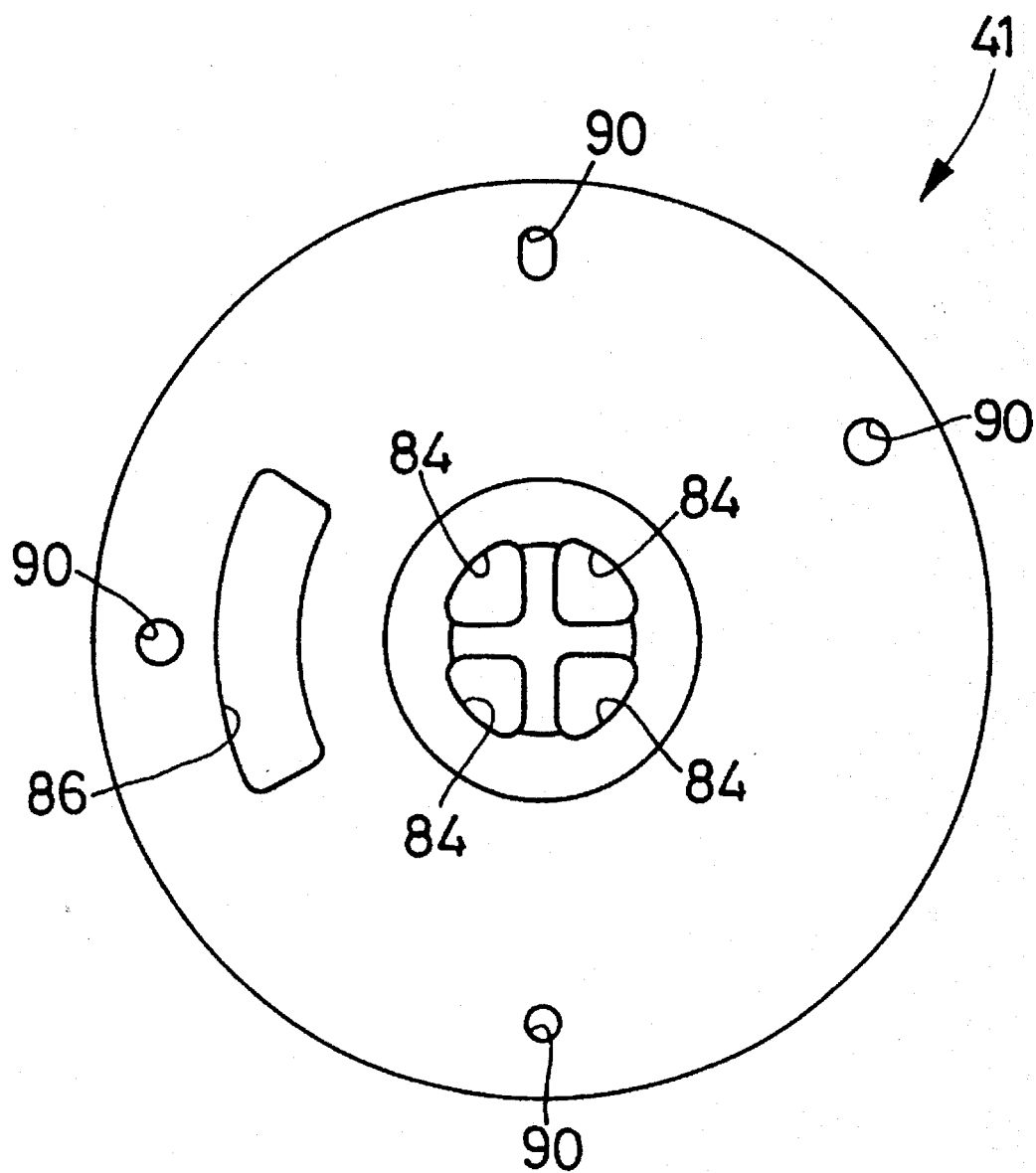
FIG. 8 is a plan view showing a partition plate used in the engine mount of FIG. 1.

As sown in FIG. 8, the partition plate 41 placed on the upper surface of the partition member 40 has four center holes communicating with the circular recess 68 of the partition member 40, and an arcuate hole 86 communicating with the arcuate hole 74 of the partition member 40. The partition member 40 has four positioning pins 88, which extend from the upper surface and are equally spaced apart from each other along a circle which is relatively near the outer circumference of the partition member 40. The partition plate 41 has four positioning holes 90 which engage the respective positioning pins 88, so that the partition member 40 and the partition plate 41 are positioned relative to each other in the circumferential direction.

Referring back to FIGS. 1 and 2, a flow restrictor member in the form of a substantially disk-like flexible rubber layer 94 is accommodated in the recess 68 formed in the partition member 40. The rubber layer 94 has an fixing portion 92 integrally formed along its circumferential edge. The rubber layer 94 is fixed to the partition member 40 such that the fixing portion 92 is gripped by and between the partition member 40 and the partition plate 41 and such that a central portion of the rubber layer 94 is elastically deformable or displaceable in the axial direction.

With the partition plate 41 placed on the upper surface of the partition member 40 constructed as described above, the circumferential groove 72 is closed by the partition plate 41. It will be understood that the partition plate 71, circumferential groove 72, through-hole 78, axial hole 80, connecting hole 82, communication hole 76, arcuate hole 74 and arcuate hole 86 cooperate to define the first orifice passage 62 for fluid communication between the pressure-receiving chamber 46 and the equilibrium chamber 48. That is, the first orifice passage 62 communicates with the pressure-receiving chamber 46 through the arcuate holes 74, 86, and with the equilibrium chamber 48 through the through-hole 78. It will also be understood that the arcuate holes 74, 86 and communication hole 76 cooperate to define the second orifice passage 64 which communicates with the pressure-receiving chamber 46 and which may communicate with the equilibrium chamber 48 through the rotary valve 60 and the valve hole 58. It will further be understood that the recess 68 and communication holes 70 formed in the partition member 40 cooperate with the center holes 84 formed through the partition plate 41 to define the third orifice passage 66 which may communicate with the equilibrium chamber 48 through the rotary valve 60 and the valve hole 58. Although the third orifice passage 66 does not communicates with the pressure-receiving chamber 46 in the presence of the flexible rubber layer 94, this rubber layer 94 which is elastically displaceable permits the fluid oscillation in the third orifice passage 66. In this respect, the third orifice passage 66 is considered to effect substantial fluid communication between the pressure-receiving chamber 46 and the equilibrium chamber 48 if the rotary valve 60 is open.

The length and cross sectional area of the first orifice passage 62 are tuned or determined so that the engine mount exhibits a sufficiently high damping effect with respect to low-frequency vibrations such as engine shakes, based on resonance of the fluid flowing through the first orifice passage 62. The length and cross sectional area of the second orifice passage 64 are tuned or determined so that the engine mount exhibits a sufficiently low spring constant with respect to medium-frequency vibrations such as engine idling vibrations, based on the fluid flow through the second orifice passage 64. Further, the length and cross sectional area of the third orifice passage 66 are tuned or determined so that the engine mount exhibits a sufficiently low spring constant with respect to high-frequency vibrations such as booming noises (generated during low-speed running of the vehicle), based on the fluid flow through the third orifice passage 66. These booming noises to be effectively damped by the third orifice passage 66 are distinguished from the booming noises to be effective damped by the annular restricted fluid passage provided by the hat-shaped member 54 explained above. As indicated above, the flexible rubber layer 94 permits substantial fluid oscillation in the third orifice passage 66 or substantial fluid flow through the passage 66, but restricts the amount of flow of the fluid through the passage 66.

Figure 9:
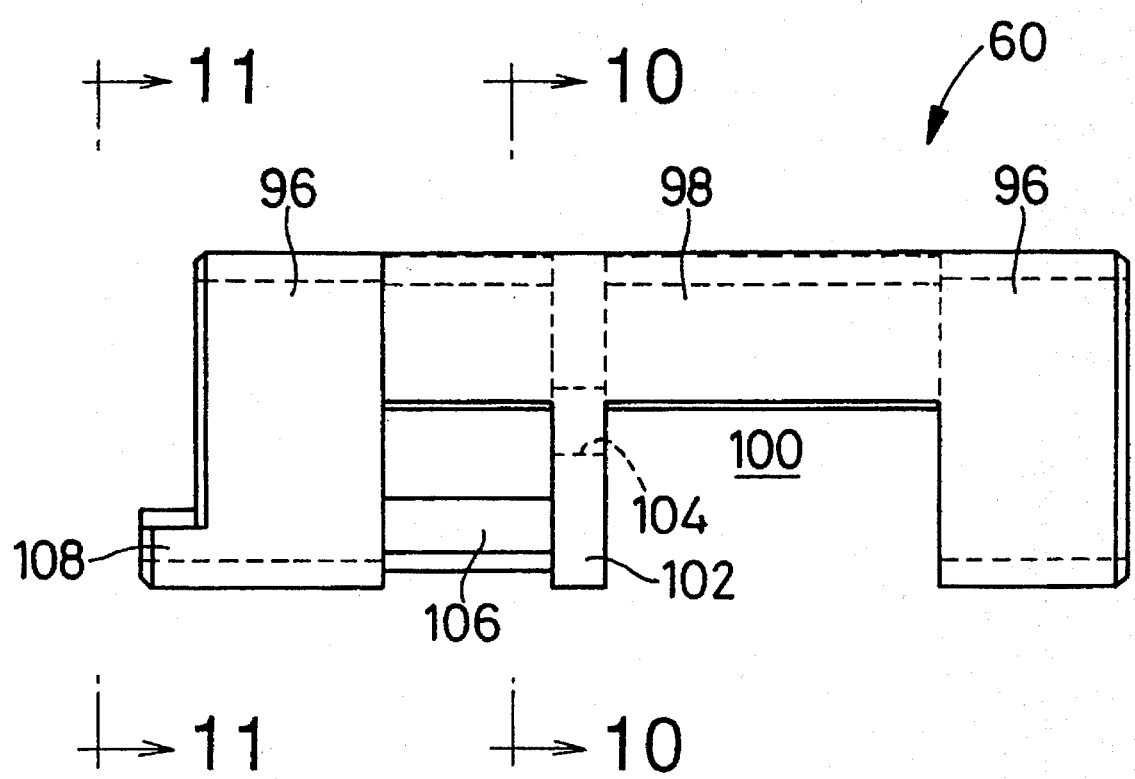
FIG. 9 is a front view of a rotary valve used in the engine mount of FIG. 1.

The ends of the second and third orifice passages 64, 66 on the side of the equilibrium chamber 48 (i.e., communication hole 76 and communication holes 70) are open on the side and upper areas of the sliding surface of the valve hole 58, respectively, and are selectively communicated with the equilibrium chamber 48 through the rotary valve 60, depending upon the selected operating position of the rotary valve 60. Described more specifically by reference to FIGS. 9–11, the rotary valve 60 includes a pair of cylindrical bearing portions 96, 96 formed at its axially opposite ends, and an intermediate arcuate valve portion 98 which extends in the axial direction and connects the two bearing portions 96, 96. The arc of the valve portion 98 corresponding to about one-fourth (¼) of the entire circumference of the bearing portions 96.

Figure 10:
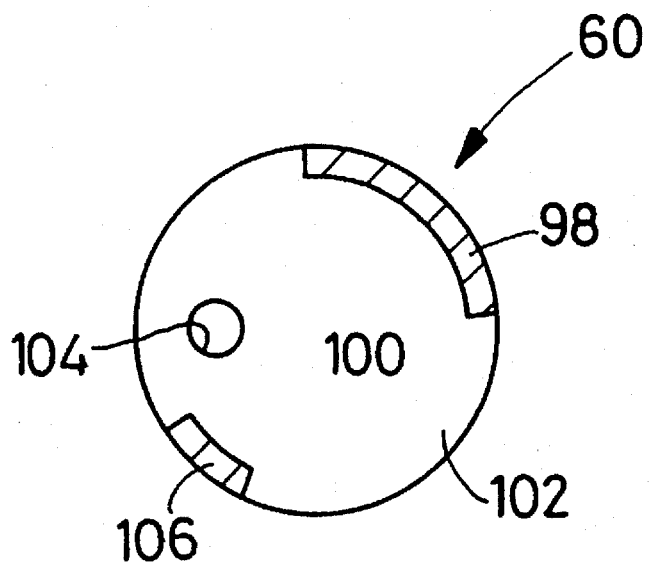
FIG. 10 is a cross sectional view of the rotary valve of FIG. 9, taken along line 10—10 of FIG. 9.
Figure 11:
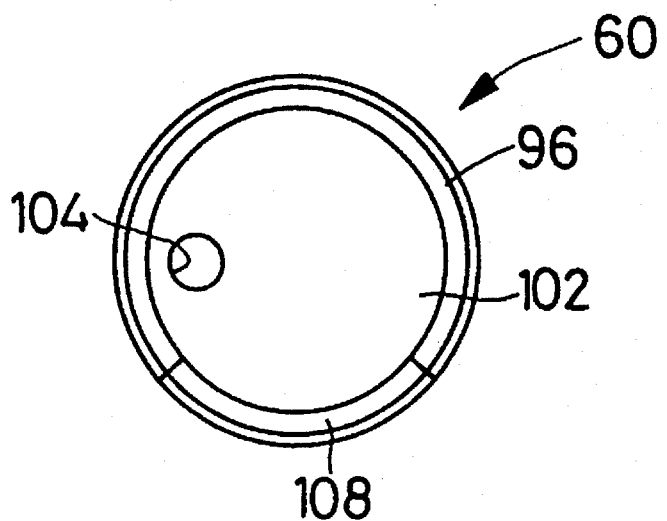
FIG. 11 is a view taken in the direction of arrows 11, 11 of FIG. 9.

The rotary valve 60 has a generally cylindrical shape, having an axially intermediate section between the two cylindrical bearing portions 96, 96. This intermediate section has a cutout 100 corresponding to about three-thirds (¾) of the circumference of the rotary valve 60. The arcuate valve portion 98 is defined by this cutout 100. The intermediate section also includes a drive portion in the form of a drive disk 102 which is formed integrally with the arcuate valve portion 98 and which divides the cutout 100 into two parts. The drive disk 102 has the same diameter as the bearing portions 96, 96. The drive disk 102 has an engagement hole 104 which is offset from the center of the drive disk 102 by a suitable distance in the radial direction of the drive disk 102, as shown in FIGS. 10 and 11. First engaging means in the form of a pivot pin 105 is fixed in the engagement pin 104, as shown in FIGS. 1 and 2. Thus, the pivot pin 105 is offset from the axis of rotation of the rotary valve 60 in the radial direction. The drive disk 102 is connected to one of the two bearing portions 96 by a reinforcing portion 106. This bearing portion 96 has an axially outwardly extending arcuate positioning projection 108, which corresponds to about one-third (⅓) of the circumference of the bearing portion 96.

Figure 4:
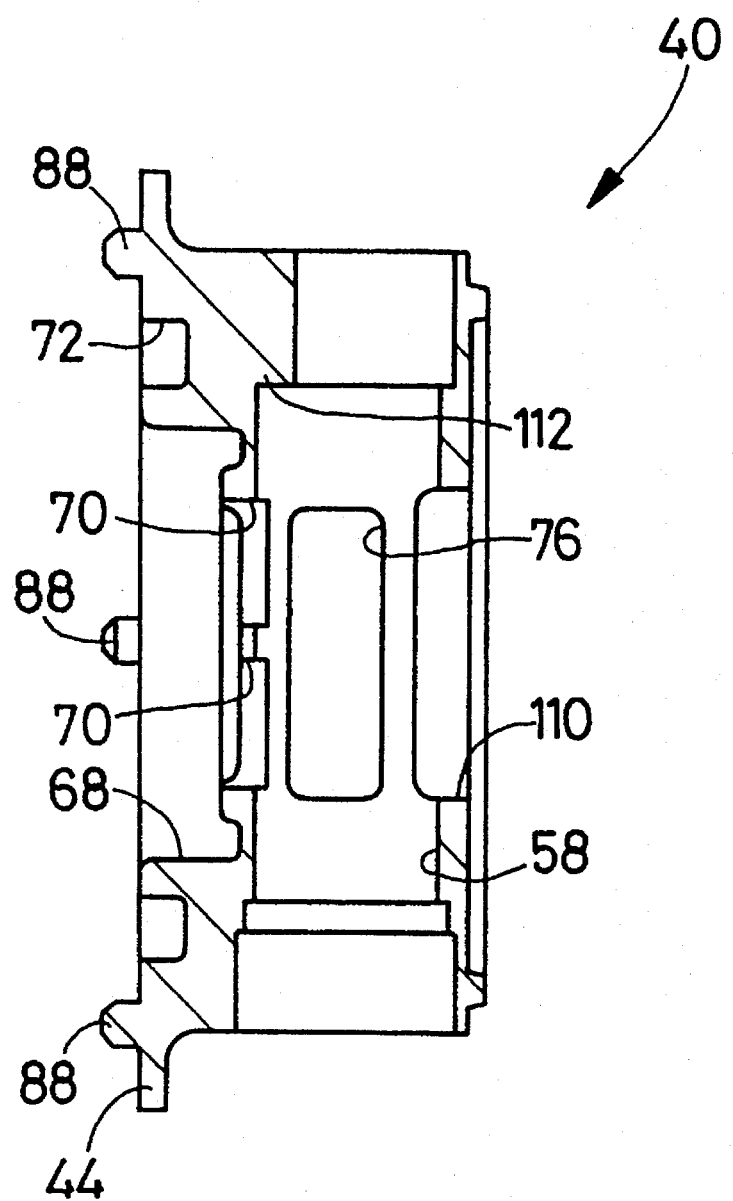
FIG. 4 is a cross sectional view taken along line 4—4 of FIG. 3.
Figure 5:
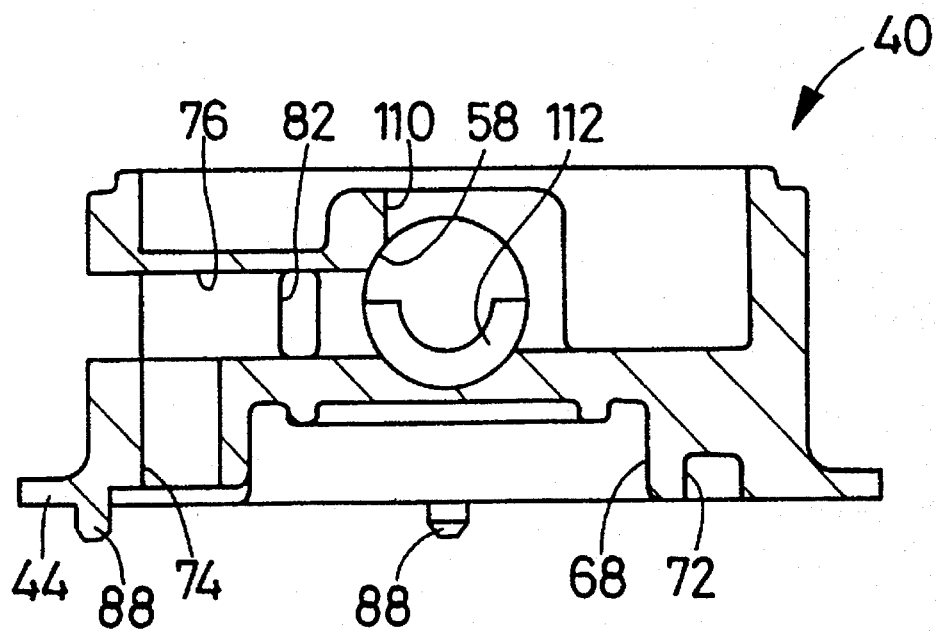
FIG. 5 is a cross sectional view taken along line 5—5 of FIG. 3.
Figure 6:
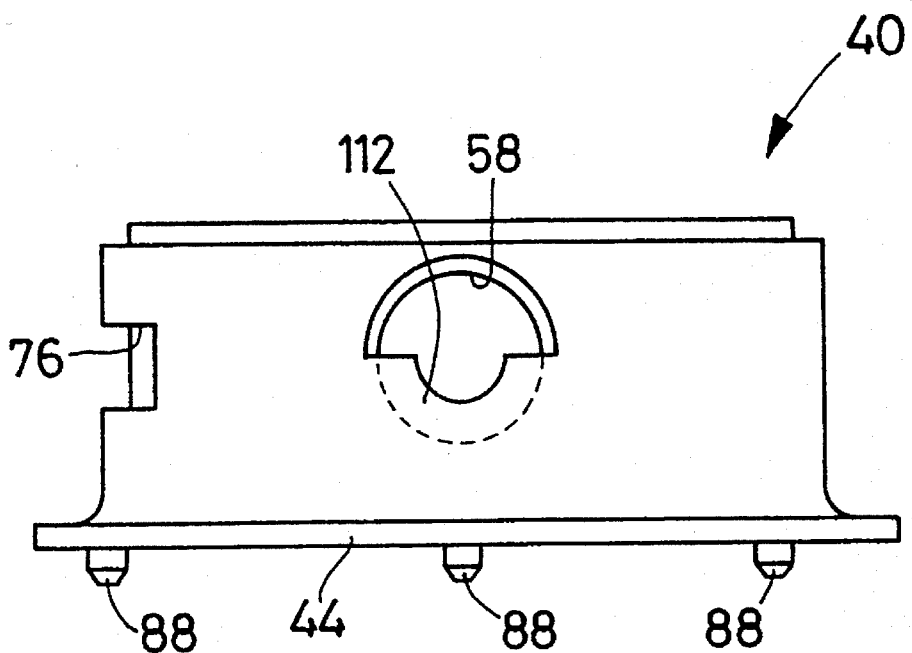
FIG. 6 is a view taken in the direction of arrows 6, 6 of FIG. 3.
Figure 7:
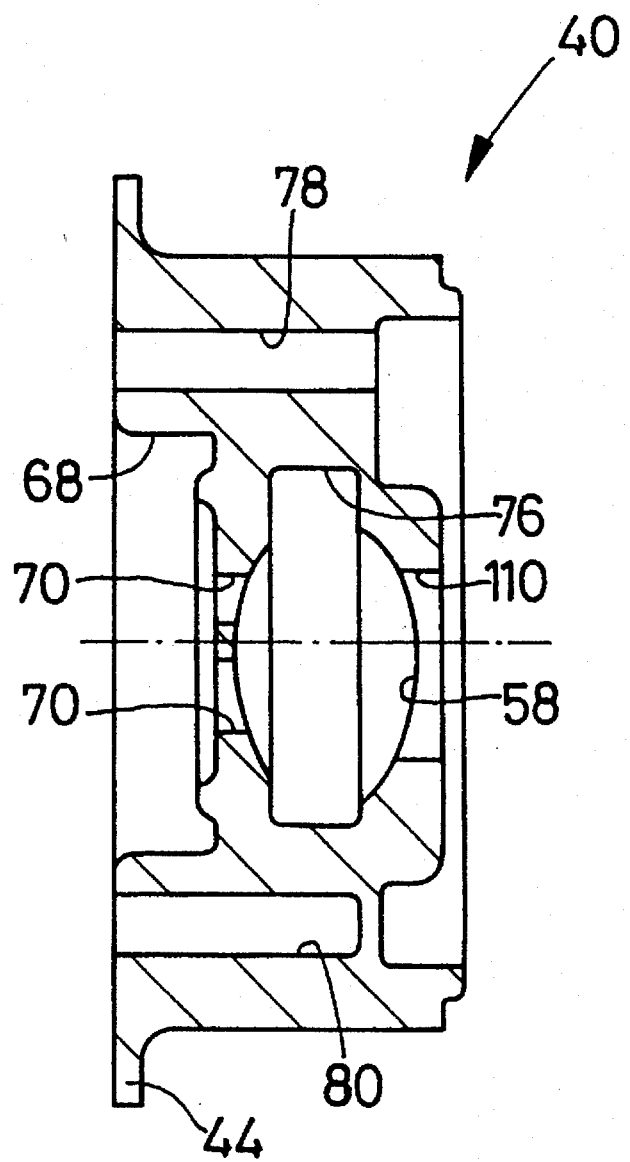
FIG. 7 is a cross sectional view taken along line 7—7 of FIG. 3.

The valve hole 58 in which the rotary valve 60 is rotatably accommodated is open downwards at an axially intermediate portion, to the equilibrium chamber 48 through a window 110 formed in the partition member 40, as shown in FIGS. 4, 5 and 7. The partition member 40 has an arcuate abutting projection 112 formed on one of opposite end walls of the valve hole 58. The abutting projection 112 extends along about one half (½) of the circumference of the valve hole 58, with a predetermined radial dimension from the edge of the appropriate end wall of the valve hole 58. The rotary valve 60 accommodated in the valve hole 58 as indicated in FIGS. 1 and 2 has two operating positions (angular positions) which are defined by abutting contact of the opposite circumferential end faces of the positioning projection 108 with the opposite circumferential end faces of the abutting projection 112. With the rotary valve 60 placed in one of these two operating positions, the open end of the third orifice passage 66 on the side of the rotary valve 60 is closed by the valve portion 98, while the second orifice passage 64 is communicated with the equilibrium chamber 48 through the cutout 100 and window 110. In the other operating position of the rotary valve 60, the open end of the second orifice passage 64 on the side of the rotary valve 60 is closed by the valve portion 98, while the third orifice passage 66 is communicated with the equilibrium chamber through the cutout 100 and window 110. As shown in FIG. 2, a C-shaped retainer ring 114 is fixed at the axial end of the valve hole 58 remote from the abutting projection 112, so that the rotary valve 60 is held by this retainer ring 114 at a predetermined axial position.

Thus, the second and third orifice passages 64, 66 are selectively brought into communication with the equilibrium chamber 48 by and through the rotary valve 60. That is, upon application of low-frequency vibrations to the present engine mount, the rotary valve 60 is operated to one of the two operating positions to close the second orifice passage 64, so that the engine mount exhibits a sufficiently high damping effect based on resonance of the fluid flowing through the first orifice passage 62. Upon application of medium-frequency vibrations to the engine mount, the rotary valve 60 is operated to the other operating position to close the third orifice passage 66, so that the engine mount exhibits a sufficiently low spring constant based on the resonance of the fluid flowing through the second orifice passage 64. Upon application of high-frequency vibrations to the engine mount, the rotary valve 60 is operated to the above-indicated one operating position to close the second orifice passage 64, so that the engine mount exhibits a sufficiently low spring constant based on the resonance of the fluid flowing through the third orifice passage 66.

Therefore, the present engine mount is capable of providing excellent damping effects over a wide range of frequency of the input vibrations, by suitably controlling the rotary valve 60 so as to change the damping characteristics depending upon the specific frequency of the input vibrations.

It is noted that when the second orifice passage 64 is closed by the rotary valve 60 upon application of the low-frequency vibrations, the third orifice passage 66 remains in communication with the equilibrium chamber 48, but the third orifice passage 66 does not significantly contribute to the damping of the low-frequency vibrations, because substantive flows of the fluid through the third orifice passage 66 due to the low-frequency vibrations having a comparatively large amplitude are restricted or limited by the flexible rubber layer 94. That is, the low-frequency vibrations are damped almost exclusively by the fluid flows through the first orifice passage 62. It is also noted that when the second orifice passage 64 is communicated with the equilibrium chamber 48 through the rotary valve 60 upon application of the medium-frequency vibrations, the first orifice passage 62 is also in communication with the equilibrium chamber 46, but the first orifice passage 62 does not significantly contribute to the damping of the medium-frequency vibrations, because the first orifice passage 62 has a considerably larger resistance to the fluid flows than the second orifice passage 64. Namely, the medium-frequency vibrations are damped almost exclusively by the fluid flows through the second orifice passage 64.

There will be described a mechanism for operating the rotary valve 60.

The rotary valve 60 is connected to a drive rod 116 for receiving a drive force from an actuator 120 (which will be described) so that the rotary valve 60 is operated or rotated. Described in detail, the drive rod 116 consists of a generally straight rod which has second engaging means in the form of a hole formed at one end (inner end) thereof. This hole engages the pivot pin 105 which is fixed in the engagement hole 104 and projects from the drive disk 102. Thus, the drive rod 116 is pivotally connected at its inner end to the pivot pin 105. As indicated above, the pivot pin 105 and the engagement hole 104 are offset from the axis of rotation of the rotary valve 60 in the radial direction. The drive rod 116 extends through the cutout 110 of the rotary valve 60 and the window 110 formed in the partition member 40, and further through the equilibrium chamber 48 and a central portion of the diaphragm 42. The drive rod 116 has an inverted-cup-shaped coupling portion 118 as its outer end portion. The central portion of the diaphragm 42 is bonded to the outer surface of the coupling portion 118 in a vulcanization process for forming the diaphragm 42. Thus, the drive rod 116 fluid-tightly projects downwards from the diaphragm 42.

Below the diaphragm 42, there is disposed the actuator 120 provided to drive the drive rod 116. The actuator 120 is of a known pneumatic diaphragm type wherein an interior space within a housing 122 is divided by a rubber film 124 into two chambers. A central portion of the rubber film 124 is sandwiched by two plates 126, 126 to which an output rod 128 is secured. The output rod 128 extends through one of the two chambers of the interior space which is nearer to the coupling portion 118 of the drive rod 116, namely, through the upper chamber as seen in FIGS. 1 and 2. The output rod 128 projects upwards from the top wall of the housing 122. In the other or lower chamber in the housing 122, there is disposed a coil spring 130 which biases the output rod 128 upwards through the plates 126. The lower chamber is connected to an air conduit 132, which in turn is connected to an external vacuum source. With a negative pressure applied to the lower chamber through the conduit 132, the output rod 128 is moved from an upper position to a lower position against a biasing action of the coil spring 130.

The actuator 120 is attached to the second mounting member 12 via a bracket 134 which extends in a diametric direction of the lower sleeve 20 and which is fixed to the lower open end of the lower sleeve 20 at its diametrically opposite circumferential positions. The output rod 128 extends into the lower sleeve 20 and fixedly engages the coupling portion 118 of the drive rod 116. When no negative or vacuum pressure is applied to the lower chamber of the actuator 120, the output rod 128 is placed in its upper position under the biasing action of the coil spring 130, whereby the drive rod 116 is placed in an upper position thereof shown in FIGS. 1 and 2, to place the rotary valve 60 in one of its two operating positions for closing the second orifice passage 64 and communicating the third orifice passage 66 with the equilibrium chamber 48. When the negative pressure is applied to the lower chamber, the output rod 128 is moved to its lower position by suction of the negative pressure against the biasing force of the coil spring 130, whereby the drive rod 116 is moved to a lower position thereof, with a result of a clockwise rotary movement (as seen in FIG. 1) of the rotary valve 60 to the other operating position for closing the third orifice passage 66 and opening the orifice passage 64 into communication with the equilibrium chamber 48.

Thus, the rotary valve 60 is rotated between the two operating positions for selectively communicating the second and third orifice passages 64, 66 with the equilibrium chamber 48 to thereby change the damping characteristics of the engine mount, by selectively connecting and disconnecting the vacuum source to the lower chamber of the actuator 120.

In the present engine mount constructed as described above, the reciprocating drive rod 116 is connected directly to the rotary valve 60, more precisely, the drive disk 102 of the valve 60. That is, the point of connection of the drive rod 116 to the rotary valve 60 is located at a position which is spaced a suitable distance from the axis of rotation of the valve 60 in the radial direction of the valve 60, so that the reciprocating movement of the drive rod 116 is converted into a rotary movement of the rotary valve 60. Thus, no linking member for converting the reciprocating movement of the drive rod 116 (output rod 128) into the rotary movement of the rotary valve 60 is required outside the rotary valve 60. Accordingly, the number of components of the mechanism for operating the rotary valve 60 can be made relatively small, and the mechanism can be simplified in construction.

It will be understood that the drive disk 102, pin 105 and drive rod 116 constitute a motion converting mechanism for converting the reciprocating movement of the output rod 128 into the rotary motion of the rotary valve 60.

Further, the drive rod 116 extends through the equilibrium chamber 48 and through the cutout 100 of the rotary valve 60. In this arrangement, the cutout 100 which serves as a fluid passage communicating with the equilibrium chamber 48 is utilized as a space for installing the drive rod 116 and permitting the movement of the drive rod 116. Accordingly, the required distance between the rotary valve and the outer end of the drive rod 116 outside the engine mount is minimized. In addition, the drive rod 116 requires a comparatively small space for its operation, namely, a comparatively small space for a relatively small reciprocating and pivotal movement. Accordingly, the size of the engine mount and the space required for the engine mount equipped with the actuator 120 are considerably reduced.

It is also appreciated that the minimum distance of projection of the drive rod 116 out of the engine mount housing is advantageous in protecting the engine mount against damage, during manufacture, assembling and transportation.

In the present embodiment, the actuator 120 for driving the drive rod 116 is disposed in substantially coaxial relation with the engine mount. This means comparatively easy assembling of the actuator 120 and a reduced space required for installation of the engine mount assembly including the actuator 120.

In the present engine mount, the drive rod 116 extends through or projects from the diaphragm 42 such that diaphragm 42 is bonded to the drive rod 116 in a vulcanization process for forming the diaphragm 42. Thus, fluid tightness is maintained between the drive rod 116 and the diaphragm 42. In this respect, the engine mount has a high degree of durability.

Since the rotary valve 60 includes the two generally hollow cylindrical bearing portions 96, 96, the valve 60 has a reduced weight leading to reduced weight of the engine mount as a whole, and assures a high degree of operating stability in terms of slidable support by the partition member 40.

While the present invention has been described above in detail in its presently preferred embodiment, it is to be understood that the invention is not limited to the details of the illustrated embodiment.

For instance, the configurations of the first, second and third orifice passages 62, 64, 66 are not limited to the details of the illustrated embodiment, but may be modified as needed depending upon the desired damping characteristics, construction and size of a fluid-filled elastic mount.

In the illustrated embodiment, the flexible rubber layer 94 is provided for restricting the fluid flows through the third orifice passage 66 upon application of low-frequency vibrations and for permitting the fluid flows in the third orifice passage 66 by oscillatory movements by elastic deformation upon application of high-frequency vibrations. However, the rubber layer 94 may be replaced by a movable plate which is oscillated over a predetermined distance within the recess 68 in the axial direction of the engine mount, so as to permit fluid flows in the third orifice passage 66 upon application of the high-frequency vibrations.

The construction of the rotary valve 60 is not confined to the details of the illustrated embodiment, but may be modified as needed depending upon the positions and sizes of the end portions of the second and third orifice passages 64, 66 which are open to the valve hole 58. For instance, the arcuate valve portion 98 may be replaced by two arcuate valve portions at the axially opposite ends, while the cylindrical bearing portions 96, 96 may be replaced by an axially intermediate cylindrical bearing portion slidably engaging the partition member 40. The drive disk 102 may be provided as an integral part of one of the bearing portions 98.

The drive rod 116 and the actuator 120 need not be aligned with the axis of the elastic mount (axes of the cylindrical first and second mounting members 10, 12), but may be offset from the axis, depending upon the construction and installation position and space of the elastic mount.

The actuator 120 of the pneumatic diaphragm type for reciprocating the drive rod 116 may replaced by any other known types of actuator, such as a solenoid-operated or other electromagnetically operated type.

In the engine mount illustrated embodiment, the second and third orifice passages 64, 66 of the three orifice passages 62, 64, 66 are selectively communicated with the equilibrium chamber 48 by the rotary valve 60. However, the principle of the present invention is equally applicable to any other type of fluid-filled elastic mount, such as a mount having only one orifice passage which is selectively closed and opened by a rotary valve, or a mount having two orifice passages one of which is selectively closed and opened by a rotary valve. Further, the cross sectional areas and lengths of the orifices passages 62, 64, 66 may be changed as desired.

While the illustrated embodiment of the invention takes the form of a fluid-filled engine mount for an automotive vehicle, the principle of the present invention is also applicable to other types of fluid-filled elastic mount, such as a body mount or member mount for an automotive vehicle, or various mounts used for equipment or devices other than a motor vehicle.

It will be obvious that the elastic mount according to the present invention may have two or more separate equilibrium chambers communicable with at least one pressure-receiving chamber through at least one orifice passage.

It is to be understood that the present invention may be embodied with various other changes, modifications and improvements, which may occur to those skilled in the art, in the light of the foregoing teaching, without departing from the spirit and scope of the invention defined in the following claims.

What is claimed is:

1. A fluid-filled elastic mount comprising:

a first mounting member to be attached to one of two members of a vibration system;

a generally cylindrical second mounting member to be attached to the other of said two members, said second mounting member including a cylindrical wall;

an elastic body elastically connecting said first and second mounting members so as to fluid-tightly close one of axially opposite open ends of said second mounting member;

a flexible diaphragm fluid-tightly closing the other of said axially opposite open ends of said second mounting member, and cooperating with said elastic body and said second mounting member to define a fluid-tight space;

a partition member disposed in said fluid-tight space so as to divide said fluid-tight space into a pressure-receiving chamber which is partially defined by said elastic body and filled with a non-compressible fluid and whose pressure changes upon application of a vibrational load to the elastic mount, and an equilibrium chamber which is partially defined by said flexible diaphragm and filled with the non-compressible fluid and whose volume is variable by displacement of said flexible diaphragm, said partition member having a sliding surface which defines a valve hole;

means for defining at least one orifice passage for fluid communication between said pressure-receiving and equilibrium chambers;

a rotary valve accommodated in said valve hole such that said rotary valve is rotatable in sliding contact with said sliding surface about an axis thereof which extends in a radial direction of said second mounting member, said rotary valve having a cutout communicating with said equilibrium chamber, and including a valve portion adjacent to said cutout, said at least one orifice passage being open on said sliding surface of said valve hole, so that at least one of said at least one orifice passage is selectively closed by said valve portion and opened through said cutout in communication with said equilibrium chamber; and a motion converting mechanism for converting a reciprocating movement into a rotary motion of said rotary valve, said motion converting mechanism including a drive rod connected at one of opposite ends thereof to said rotary valve at a position which is offset from said axis of said rotary valve in a radial direction of said rotary valve, said drive rod extending through said cutout, said equilibrium chamber and said flexible diaphragm, the other of said opposite ends of said drive rod being located outside said fluid-tight space for receiving said reciprocating movement.

2. A fluid-filled elastic mount according to claim 1, wherein said at least one orifice passage comprises a first orifice passage tuned to damp low-frequency vibrations, a second orifice passage tuned to damp medium-frequency vibrations whose frequencies are higher than those of said low-frequency vibrations, and a third orifice passage tuned to damp high-frequency vibrations whose frequencies are higher than those of said medium-frequency vibrations, said fluid-filled elastic mount further comprising a flow restrictor member disposed in said third orifice passage, said flow restrictor member being displaceable so as to permit a predetermined amount of flow of said non-compressible fluid in said third orifice passage, said second and third orifice passages being open on said sliding surface of said valve hole, so that said second and third orifice passages are selectively brought into communication with said equilibrium chamber through said cutout of said rotary valve when said rotary valve is operated between two operating positions thereof.

3. A fluid-filled elastic mount according to claim 2, wherein said drive rod is connected at said other of said opposite ends thereof to an output shaft of a linear actuator operated by selective application of reduced pressure such that said rotary valve is placed in one of said two operating positions when said reduced pressure is applied to said linear actuator.

4. A fluid-filled elastic mount according to claim 2, further comprising a hat-shaped member attached to said first mounting member and disposed within said pressure-receiving chamber, said hat-shaped member and said elastic body cooperating to define a restricted fluid passage for damping very-high-frequency vibrations whose frequencies are higher than those of said high-frequency vibrations.

5. A fluid-filled elastic mount according to claim 1, wherein said rotary valve comprises:

a pair of cylindrical bearing portions rotatable about said axis in sliding contact with said sliding surface of said valve hole in said partition member, said valve portion extending in an axial direction of said rotary valve and connecting said pair of cylindrical bearing portions;

said valve portion consisting of an arcuate portion corresponding to a predetermined portion of an entire circumference of said rotary valve, said cutout corresponding to a rest of said entire circumference, said arcuate portion being rotatable about said axis in sliding contact with said sliding surface so that said at least one of said at least one orifice passage is selectively brought into communication with said equilibrium chamber through said cutout; and a drive portion fixedly provided on one of said pair of cylindrical bearing portions and said valve portion, such that said drive portion is rotatable about said axis with said cylindrical bearing portions and said valve portion.

6. A fluid-filled elastic mount according to claim 5, wherein said drive portion consists of a drive disc formed integrally with said valve portion, said drive disc including first engaging means located at said position offset from said axis of said rotary valve, said drive rod including second engaging means provided at said one of opposite ends thereof and engaging said first engaging means.

7. A fluid-filled elastic mount according to claim 5, wherein said partition member and said rotary valve cooperate to provide means for determining operating positions of said rotary valve.

8. A fluid-filled elastic mount according to claim 1, wherein said axis of said rotary valve which extends in the radial direction of said generally cylindrical second mounting member passes a radially central portion of said fluid-tight space, said drive rod extending through a radially central portion of said flexible diaphragm.

9. A fluid-filled elastic mount according to claim 1, wherein said drive rod includes a coupling portion at said other of said opposite ends thereof, said flexible diaphragm including a central portion bonded to a portion of said coupling portion.

10. A fluid-filled elastic mount according to claim 1, wherein said generally cylindrical mounting member comprises two sleeves fixed thereto, said partition member being supported by said two sleeves such that an outer portion of said partition member is gripped by and between said two sleeves.

* * * * *